(12) United States Patent
Fernandez et al.

(10) Patent No.: US 8,644,388 B2
(45) Date of Patent: Feb. 4, 2014

(54) METHOD AND DEVICE FOR APPROXIMATING A DC COEFFICIENT OF A BLOCK OF PIXELS OF A FRAME

(75) Inventors: Francisco Merlos Fernandez, Alhama de Murcia (ES); Klaus Zimmermann, Deizisau (DE); Markus Veltman, Stuttgart (DE)

(73) Assignee: Sony Corporation, Tokyo (JP)

( * ) Notice: Subject to any disclaimer, the term of this patent is extended or adjusted under 35 U.S.C. 154(b) by 733 days.

(21) Appl. No.: 12/582,801

(22) Filed: Oct. 21, 2009

(65) Prior Publication Data

US 2010/0158122 A1 Jun. 24, 2010

(30) Foreign Application Priority Data

Nov. 12, 2008 (EP) .................................. 08019761

(51) Int. Cl.
  *H04N 11/02* (2006.01)
(52) U.S. Cl.
  USPC ...................................................... 375/240.16
(58) Field of Classification Search
  None
  See application file for complete search history.

(56) References Cited

U.S. PATENT DOCUMENTS

| | | | |
|---|---|---|---|
| 7,880,815 B2 * | 2/2011 | Yeh et al. ........................ | 348/700 |
| 8,254,444 B2 * | 8/2012 | Chappalli ................. | 375/240.09 |
| 2003/0235248 A1 * | 12/2003 | Kim et al. ................. | 375/240.12 |
| 2006/0187358 A1 * | 8/2006 | Lienhart et al. ............... | 348/661 |
| 2007/0160128 A1 * | 7/2007 | Tian et al. ...................... | 375/240 |
| 2007/0206931 A1 | 9/2007 | Barbieri et al. | |
| 2007/0256091 A1 * | 11/2007 | Horiguchi ....................... | 725/22 |

OTHER PUBLICATIONS

Sadlier et al., "Automatic TV Advertisement Detectin from MPEG BitStream", Dec. 2002, The Journal of the Pattern Recognition Society, pp. 2719-2726.*
Jokinen et al., "Detection of Dynamically Inconsistent Samples in Measured Signals", Feb. 28, 2006, Institute of Measurement and Information Technology, Tampere University of Technology, pp. 144-150.*
Ke Shen et al., "A Fast Algorithm for Video Parsing Using MPEG Compressed Sequences", Proceedings of the International Conference on Image Processing, vol. 2, Oct. 23, 2009, pp. 252-255, XP010197072.
Boon-Lock Yeo et al., "On the Extraction of DC Sequence From MPEG Compressed Video", Proceedings of the International Conference on Image Processing, vol. 2, Oct. 23, 1995, pp. 260-263, XP010197074.
N. Dimitrova, et al., "Real time commercial detection using MPEG features", Proc. $9^{th}$ Int. Conf. on Information, 6 pages.
U.S. Appl. No. 12/603,056, filed Oct. 21, 2009, Fernandez et al.
U.S. Appl. No. 12/893,677, filed Sep. 29, 2010, Lei, et al.
Chinese Office Action issued Dec. 31, 2011, in Patent Application No. 200910206401.1 (with English-language translation).
Chinese Office Action issued Nov. 5, 2012, in Chinese Patent Application No. 200910206401.1 (with English translation).

* cited by examiner

*Primary Examiner* — Mehrdad Dastouri
*Assistant Examiner* — James Anderson, II
(74) *Attorney, Agent, or Firm* — Oblon, Spivak, McClelland, Maier & Neustadt, L.L.P.

(57) ABSTRACT

A method and a device for approximating a DC coefficient of a first block of pixels of a first frame are proposed. The method comprises: calculating a luminance DC average value based on DC coefficients of first frame's macro-blocks without an approximation error; and determining the DC coefficient of the first block based on the DC coefficient of a second block, wherein the second block is a part of a second frame, which is a reference frame of the first frame, the second block overlapping with a reference block of the first block and having the closest DC coefficient to the luminance DC average value.

15 Claims, 8 Drawing Sheets

METHOD AND DEVICE FOR APPROXIMATING A DC COEFFICIENT OF A BLOCK OF PIXELS OF A FRAME

An embodiment of the invention relates to a method and device for approximating a DC coefficient of a first block of pixels of a first frame. A further embodiment of the invention relates to a method and device for detecting a monochrome frame in a video stream.

BACKGROUND

In video streams sometimes monochrome frames are used to signal borders between different parts of the video stream, e.g. between shots taken by e.g. a camera or camcorder, or between commercial spots or the like.

Monochrome frames are video frames containing a homogeneous and uniform single color distribution across the frame. Monochrome frames use to appear in the boundaries between two commercials but they also appear during fades, right before the credits of a film or even during strong flashes. Throughout this specification frames are also referred to as pictures or images.

The presence of a logo in a frame would make it not monochrome. However, since this logo was added to the frame afterwards, the rest of the frame might be monochrome. As a result, two kinds of monochrome frames have to be considered: the ones with the presence of a logo, and ones without it.

Nowadays, most of video data is transmitted in a compressed form, e.g. in MPEG-2 (Motion Pictures Expert Group) form. In MPEG-2, Motion Compensation is performed in the spatial domain, that is, after the decoding of the required reference frames. To be able to Motion Compensate any frame, first, the reference frames on which the frame to reconstruct is based have to be decoded and buffered.

Then, using the motion vectors for the current frame, the required pixel information is taken from the corresponding decoded reference frames and placed in the current frame. Additionally, for predicted frames with differential error coding, the transmitted error is decoded and added to the motion estimation.

In the compressed domain, however, this motion compensation process cannot be applied for one fundamental reason: while in the spatial domain all the pixels corresponding to the reference frames are available (since they have been previously decoded), in the compressed domain only the DCT coefficients of each previously delimited macro-block may be used. In most cases, the reference region pointed to by the motion vectors does not match with a unique macro-block, but overlaps several macro-blocks.

There are several MPEG standards for digital video: MPEG-1, MPEG-2, MPEG-4. MPEG-2 is intended for high data rate video application ranging from video conferencing to High Definition TV.

Like any compression algorithm, MPEG-2 tries to reduce the redundancy in the video data.

In general, uncompressed video data consists of a sequence of consecutive frames taken at different instants in time. In MPEG-2, each frame is hierarchically divided in slices, macro-blocks (MBs), blocks and pixels (pels). The pels (or pixels) are the smallest image elements, and they represent individual sample values of luminance and chrominance (equivalent to red, green and blue color intensities in RGB standards). A block is a set of 8×8 pels, a macro-block consists of 4 blocks or 16×16 pels, and a slice is a horizontal array of 1×n macro-blocks, n being the number of macro-blocks from 1 to the maximum number of macro-block horizontally.

Like JPEG image compression algorithm, MPEG-2 employs a block-based two-dimensional Discrete Cosine Transform (DCT). A block of 8×8 pels is transformed into a 8×8 block of DCT coefficients.

In pel blocks with uniform luminance and color, like a piece of the sky, a few DCT coefficients will concentrate all the energy, while the rest will be zero or almost zero. Thus, very frequently, for each 64 frame block only a few DCT coefficients have to be transmitted, reducing the amount of information tremendously. Thus, for a monochrome block, only the top leftmost coefficient (also called DC coefficient) would be non zero, while for a high textured or noisy block, the bottom rightmost part would contain some non-zero values. After quantization, the resulting non-zero coefficients are scanned in a zigzag way starting from the upper rightmost coefficient, and are encoded using a Variable Length Coding (VLC).

Temporal redundancy exists due to the similarity between adjacent frames. In MPEG-2 there are 3 main types of frames: I-frames, P-frames and B-frames. In I-frames all macro-blocks are intra-coded, that means, the quantized DCT coefficients of all macro-blocks are transmitted. In P-frames, macro-blocks can be either intra-coded, forward predicted, or skipped, depending on the degree of change of the macro-block with respect to the previous frame. Similarly, B-frames macro-blocks can be intra-coded, skipped, forward predicted, backward predicted or bi-directionally predicted.

Each forward predicted macro-block is derived from the previous reference frame's (I or P-frame) macro-block pointed to by a motion vector (MV), and an estimated error. That is, instead of transmitting the DCT coefficient of the macro-block, a motion vector pointing to the previous position of the macro-block is provided together with the estimated error of this prediction. This way the DCT coefficient information of previous reference frames is used to derive the current macro-block information. In the same fashion, backward predicted macro-blocks consist of a motion vector pointing to the position of the macro-block in the next reference frame.

Bi-directionally predicted macro-blocks contain two motion vectors, one from the previous reference frame, and one of the next reference frame.

The motion vectors are calculated during the compression process by comparing each macro-block with some or all other macro-blocks in the previous and/or next reference frame. There are several ways how this motion vectors can be obtained.

The most popular is the Inter-frame Hybrid Coding. With this method, the motion vectors are obtained in the Motion Estimator in the spatial domain, that is, with the uncompressed video information. Then, the motion vectors will be differentially encoded: each transmitted motion vector represents the difference with respect to the previously transmitted motion vector. Finally, the Motion Compensated Predictor obtains the difference between the reconstruction based on motion vector and the original frame. For this purpose the encoded DCT coefficients have to be inverse quantized and inverse transformed. The differential error is VLC coded and sent together with the motion vectors and a flag indicating whether there is such error information or not. MPEG-2 can deal with both Progressive and Interlaced video.

Pictures or frames are organized in Groups of Pictures (GOP). A GOP is a combination of one I frame and zero or more P and B-frames which is usually (but not necessarily)

periodically repeated during the whole video sequence. A GOP contains at least and just one I-frame, which is located at the beginning of the GOP.

In US 2007-0256091 A1 a method to extract monochrome frames in the spatial domain (i.e. after decompression) by comparing the pixels average value is disclosed. However, the video stream has to be fully decompressed, incurring in high computational cost, especially when applied to high quality video streams.

In US 2007-0206931 a method for extracting monochrome frames in the compressed domain by using statistical number or intra-coded macro-blocks is disclosed. The average number of intra-coded macro-blocks is used as an indicator of the presence of a monochrome frame. However, this method can only be applied to P- and B-frames, since I-frames are always intra-coded.

Thus, there is a need for an improved method and device for approximating a current of first blocks of pixels of a compressed frame and an improved method and device for detecting a monochrome frame or frame in a compressed video stream and a respective computer program product.

Further details of the invention will become apparent from a consideration of the drawings and ensuing description.

BRIEF DESCRIPTION OF THE SEVERAL VIEWS OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following, embodiments of the invention are described. It is important to note, that all described embodiments in the following may be combined in any way, i.e. there is no limitation that certain described embodiments may not be combined with others. Further, it should be noted that same reference signs throughout the figures denote same or similar elements.

It is to be understood that other embodiments may be utilized and structural or logical changes may be made without departing from the scope of the invention. The following detailed description, therefore, is not to be taken in a limiting sense, and the scope of the present invention is defined by the appended claims.

It is to be understood that the features of the various embodiments described herein may be combined with each other, unless specifically noted otherwise.

Figure 1:
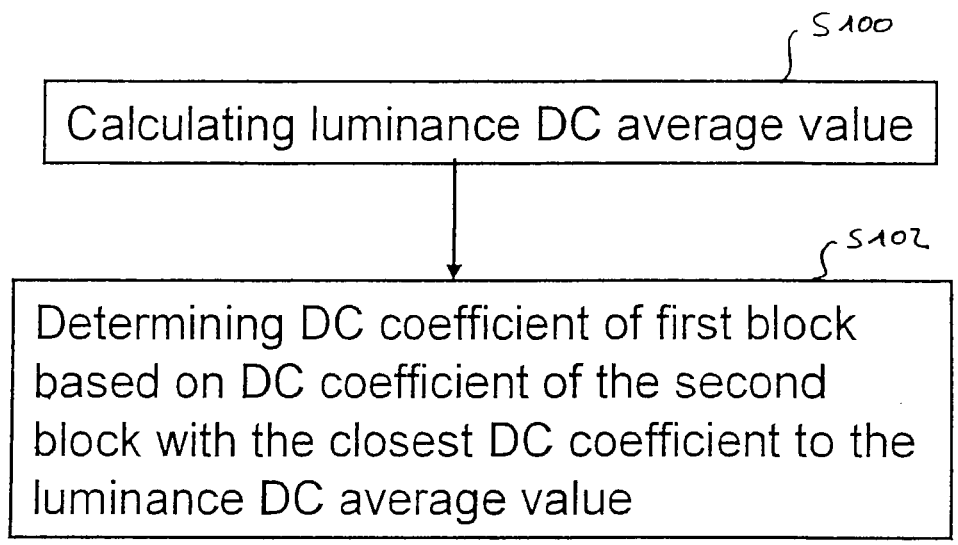
FIG. 1 shows a schematic flowchart of a method according to an embodiment of the invention.

In FIG. 1 a flowchart of a method for approximating a DC coefficient of a first block of pixels of a first frame is schematically depicted. In S100 a luminance DC average value is calculated based on DC coefficients of first frame's macro-blocks without an approximation error.

The term "first frame" might also be referred to in this specification as "current frame" or "first frame" and the term "block" might also be referred to as "subblock".

The DC coefficient is the lowest frequency coefficient. The process to obtain the approximation of the rest of the DCT coefficients is, however, analogous. Moreover, the algorithm will work at a subblock level. Each macro-block consists of 4 such luminance subblocks of 8×8 DCT coefficients. The first coefficient is the lowest frequency component or DC coefficient. Each subblock will have assigned the same macro-block type as the macro-block it belongs to. Each subblock will have assigned the motion vector of their corresponding macro-block except in the case of field macro-block. The motion vectors consist of a pair (x, y) representing the horizontal and vertical shift with respect to the current subblock position.

The overall process for DC coefficient approximation can be divided in two parts. First, based on the frame type, macro-block type and motion vectors, the reference region and the up to 4 surrounding subblocks have to be located. Then, the currently predicted DC coefficient will be approximated based on one or several of these surrounding subblocks. This process is repeated for each macro-block to be predicted.

For each subblock, the location of the corresponding reference subblocks is determined as follows.

If the decoded frame is of P type, the following cases apply depending on the macro-block type:
Forward predicted: the motion vectors point to the reference region in the previous reference frame
Skipped: the motion vectors are zero and point to the reference region in the previous reference frame If the decoded frame is of B type, the following cases apply depending on the macro-block type:
Forward predicted: the motion vectors point to the reference region in the previous reference frame
Backward predicted: the motion vectors point to the reference region in the next reference frame
Bi-directionally predicted: two pairs of motion vectors are transmitted, one pointing to the previous reference frame, and one pointing to the next reference frame reference region
Skipped: the motion vectors and macro-block type are identical to the previously computed non-skipped subblock. After motion vector and macro-block type information is copied from the corresponding previous non-skipped subblock, one of the previous cases shall apply.

The DC coefficients without an approximation error might be predicted macro-blocks with a zero motion vector with respect to a reference macro-block or they might be macro-blocks that are skipped with respect to a reference macro-block or they might be macro-blocks of the first frame that are intra-coded.

In S102 the DC coefficient of the first block is determined based on the DC coefficient of a second block, wherein the second block is a part of a second frame, which is a reference frame of the first frame. The second block overlaps with a reference block of the first block and has the closest DC coefficient to the luminance DC average value.

The proposed method is also referred to as "Closest to Expected Monochrome Value". The method does not intend to obtain an accurate approximation of the original frame. Instead, it intends to correctly reconstruct monochrome frames. As a result, monochrome frames will be reconstructed with higher accuracy than any of previous methods, while non-monochrome frames will experiment a higher approximation error (in terms of MSE: mean square error).

Before starting the DC coefficient approximation, the method assumes that the current frame is a monochrome frame, and calculates the luminance DC average value from the:
  current frame intra-coded macro-block (MB)'s DC coefficients. Since intra-coded, these values do not have any approximation error.
  corresponding reference frames' forward, backward or bi-directionally predicted macro-blocks (MB) with zero motion vectors (MV). Since the motion vectors are zero, the reference region overlaps completely with the current subblock position and there is no approximation error.
  corresponding reference frames' skipped macro-blocks (only for P-frames DC approximation).

In P-frames, skipped macro-blocks are equivalent to forward macro-blocks with zero motion vectors and no coded error.

The method might be explained in further detail with reference to FIG. 2.

Let γ be the so calculated expected average monochrome DC coefficient, then for each subblock $SB_{Cur}$, $$DC(SB_{Cur}) = DC(SB_i) + DC_{Err} \quad (1)$$

$$|DC(SB_i) - \gamma| \leq |DC(SB_j) - \gamma|, \forall j \neq i, i,j \in \{1, 2, 3, 4\} \quad (2)$$

with $DC_{Err}$ being a transmitted error coefficient. That means, the DC coefficient closest to the expected monochrome DC value will be selected.

The DC approximation scheme might also comprise a combination of two methods.

For instance, it is possible that a third block belonging to a third frame that is a reference frame of the second frame is determined. The third block has the largest overlap with a reference block of the second block. Afterwards the DC coefficient of the second block is determined based on a DC coefficient of the third block.

Figure 2:
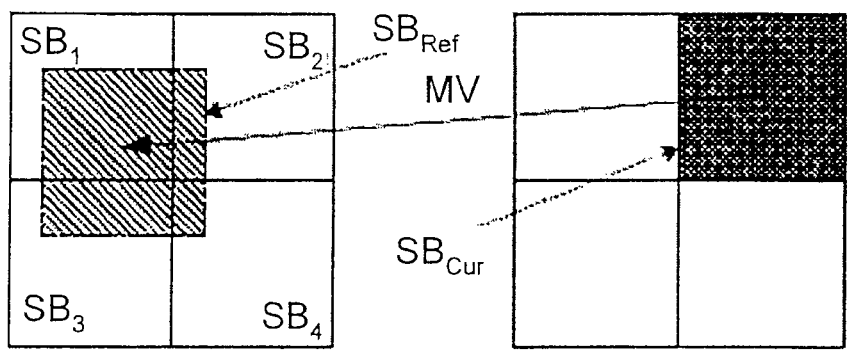
FIG. 2 shows schematically a first and a second block according to a further embodiment of the invention.

The first method of the combination is also referred to as "Closest Subblock Selection" and might be explained also with reference to FIG. 2. Based on the current subblock ($SB_{Cur}$) position and the motion vectors (MV), the closest subblock to the reference region is selected and its DC coefficient is copied in $SB_{Cur}$. This method has the advantage of being fast, since little computations need to be done.

With this method P-frames will be first approximated to minimize the carried error and to generate a good approximation in terms of MSE. Then, using the obtained P-frames as reference frames, the "closest to expected monochrome value" method of equations (1) and (2) will approximate P and B frames DC coefficients.

Figure 9:
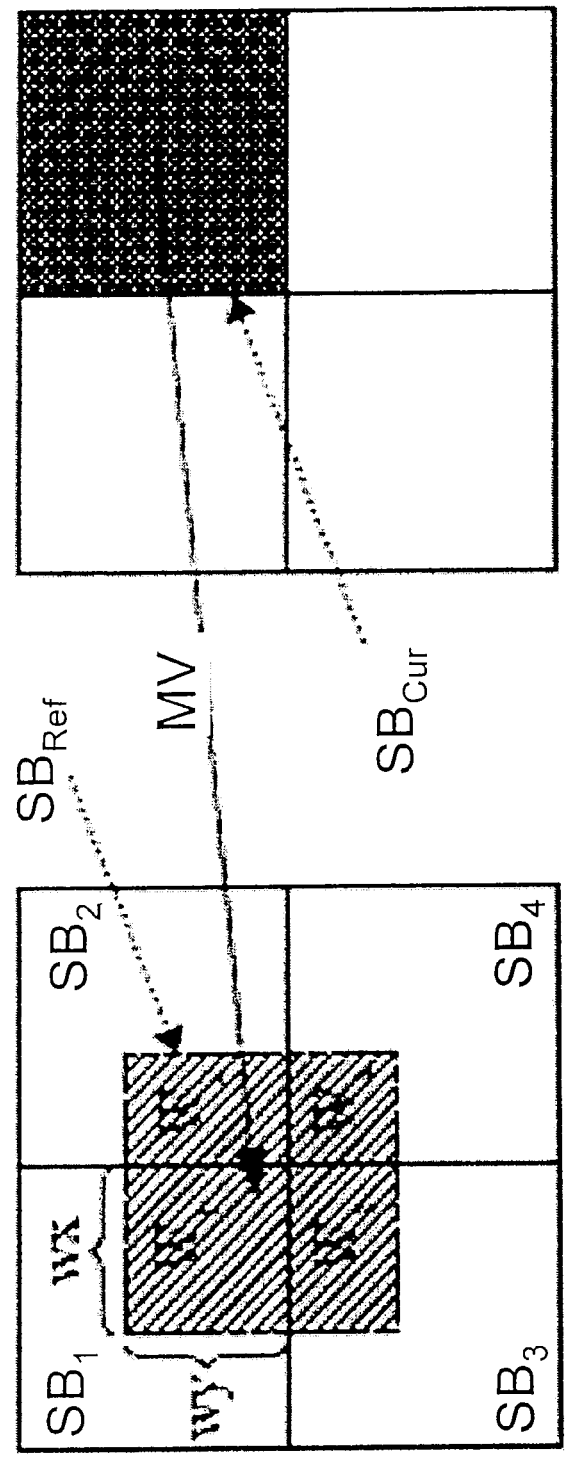
FIG. 9 shows schematically a further possibility to approximate a first block according to a further exemplary example.

In FIG. 9 a further method of approximating a DC coefficient is depicted, which is also referred to as "weighted sum".

With this "weighted sum"-method the DC coefficient of the current subblock ($SB_{Cur}$) is approximated by the weighted sum of the DC coefficients of the up to 4 subblocks surrounding the original reference region:

$$DC(SB_{Cur}) = \sum_{i=1}^{4} w_i \cdot DC(SB_i) + DC_{Err} \quad (3)$$

Where the weights $w_i$ represent the fraction of each subblock's $SB_i$ area that overlaps the reference subblock region and $DC_{Err}$ represents the transmitted coded error DC coefficient. In general this method represents a good approximation in terms of mean squared error (MSE). However, this does not necessarily mean that it is better for the later video features extraction. This is especially true for the monochrome frame detection, since the error introduced by considering all macro-blocks, even if they are very separated to the reference region, may result in a different DC value for the reconstructed macro-block than the expected one. Moreover this approximation method has, however, the disadvantage of requiring a high computational power. To approximate each subblock, first the corresponding overlapping areas have to be calculated, and then the weighted sum has to be built. In comparison, the closest subblock selection method just needs to perform a round division per Motion vector component to find the selected subblock and then the DC coefficient is just copied.

When comparing the methods by evaluating the following table has been obtained on an exemplary video stream. The table shows the results of the luminance DC coefficients variance for an approximated monochrome frame for each of the three described methods. Since a real monochrome frame has been used, the lowest variance values indicate a better approximation of the monochrome frame.

| Approximation Method | Luminance DC variance |
| --- | --- |
| Weighted Sum approximation | 473090 |
| Closest Subblock approximation | 199340 |
| Closest to estimated value approximation | 7869 |

Since the frame is originally monochrome, the ideal variance should be 0, however, because of approximation errors it is usually not zero.

As is indicated, the best method for approximating this forward predicted monochrome frame is, by far, the closest to estimated value approximation.

Figure 3:
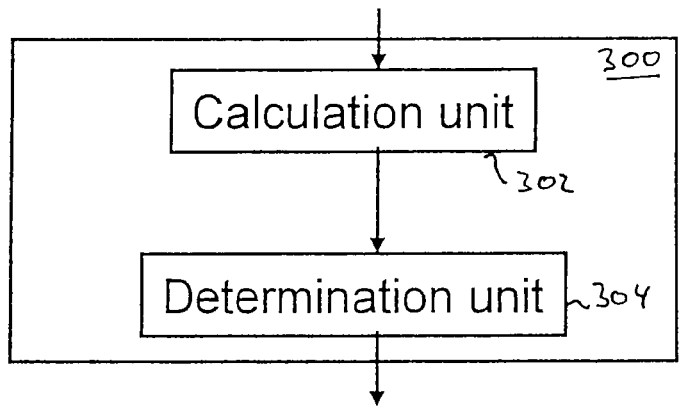
FIG. 3 shows schematically a device according to a further embodiment of the invention.

In FIG. 3 a device 300 for approximating a DC coefficient of a first frame is depicted. The device 300 comprises a calculation unit 302 configured to calculate the luminance DC average value based on the DC coefficients of the first frame's macro-blocks without approximation error and further comprises a determination unit 304 configured to determine the DC coefficient of the first block based on the DC coefficient of the second block, wherein the second block is a part of the second frame, which is a reference frame of the first frame. The second block overlaps with the reference block of the first block and has the closest DC coefficient to the luminance DC value.

Figure 4:
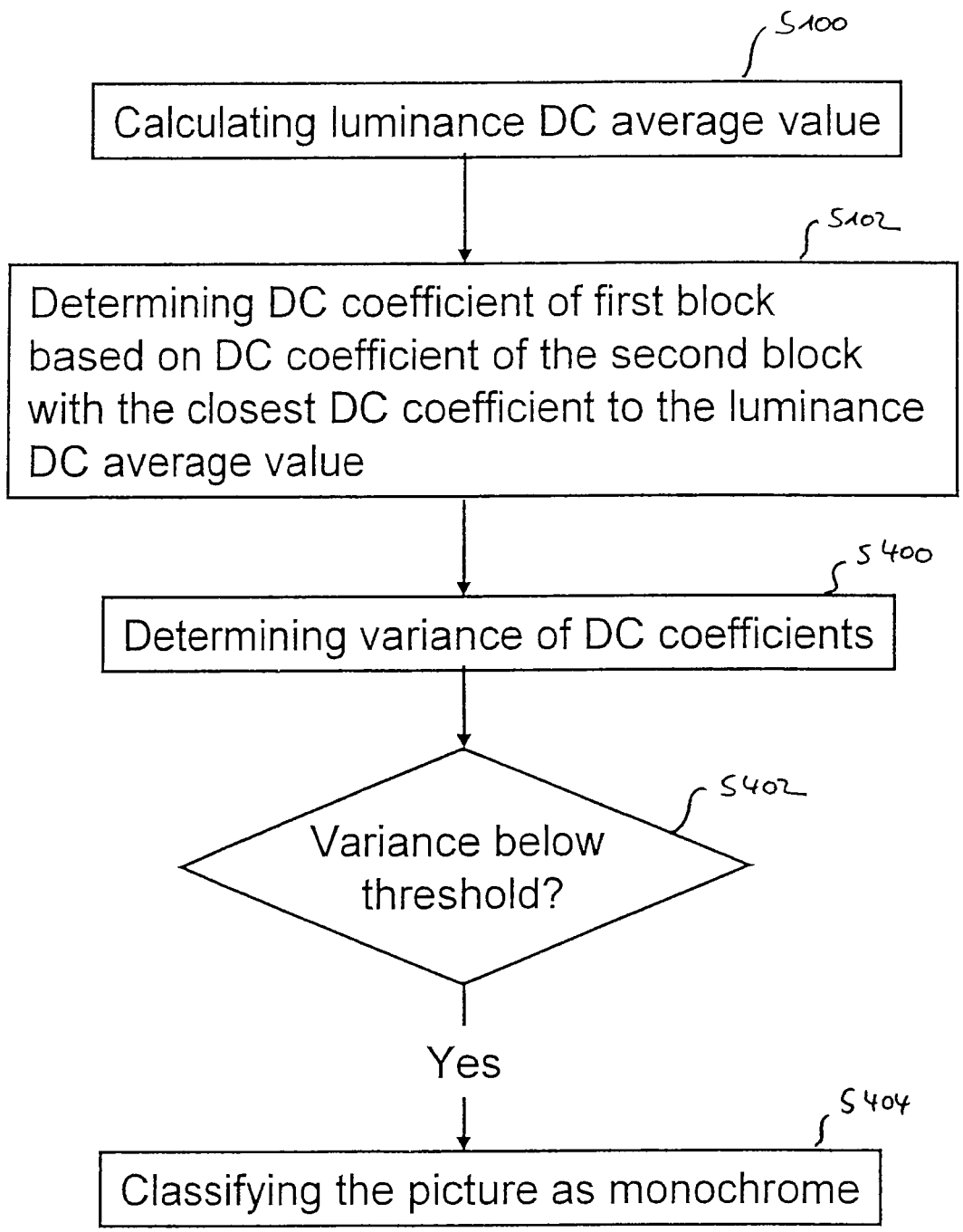
FIG. 4 shows schematically a flowchart of a method according to a further embodiment of the invention.

In FIG. 4 a flowchart of a method for detecting a monochrome frame in a video stream is depicted. After approximating the DC coefficients in S100 and S102 the variance of DC coefficients is determined in S400. In S402 it is checked whether the variance is below a predetermined threshold. If the variance is below the predetermined threshold the frame is classified as monochrome.

Figure 5:
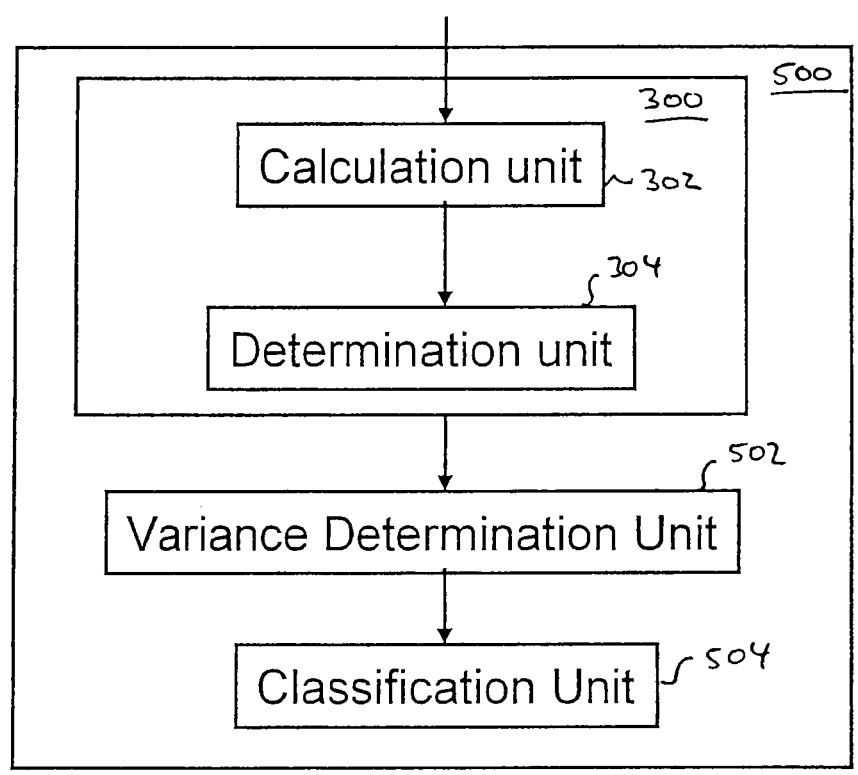
FIG. 5 shows schematically a device according to a further embodiment of the invention.

Correspondingly a schematic diagram of a device 500 for detecting a monochrome frame is depicted in FIG. 5. The device 500 includes the device 300 for approximating DC coefficients and a variance determination unit 502 configured to determine the variance of DC coefficients in the frame and a classification unit 504 configured to classify the frame as monochrome if the variance is below a second predetermined threshold.

Figure 6:
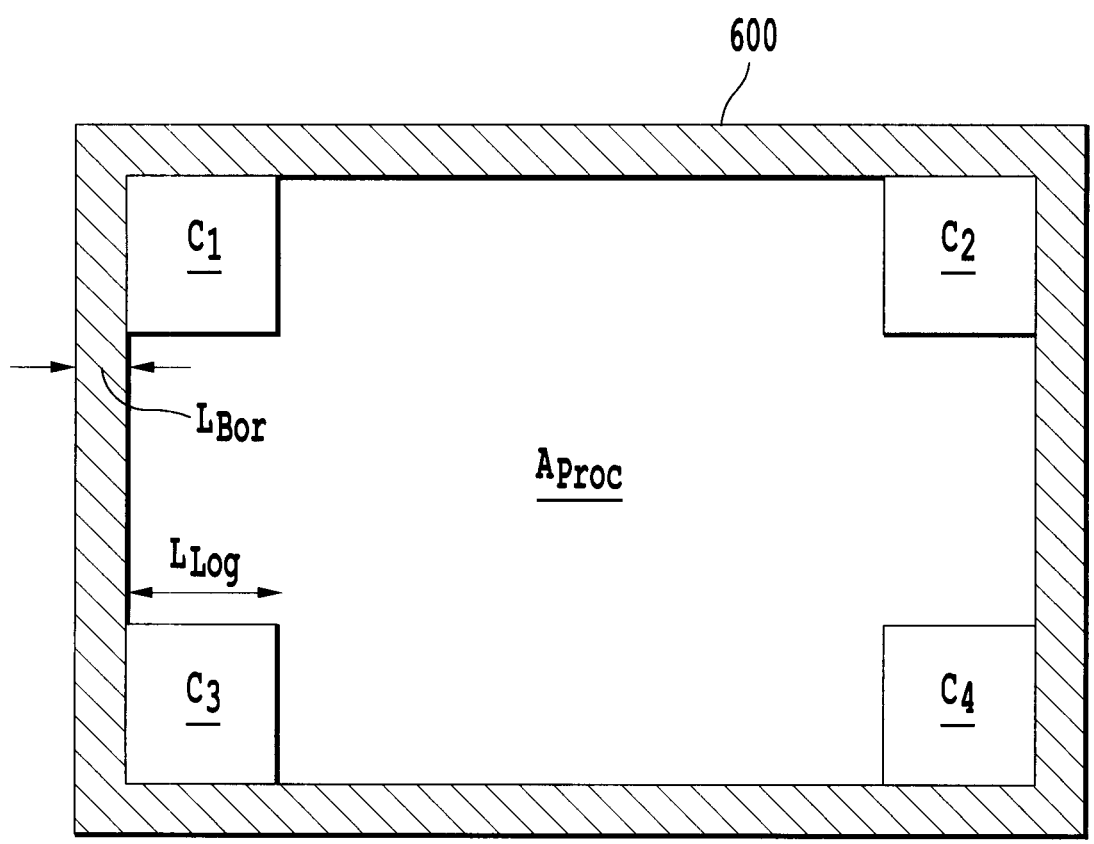
FIG. 6 shows schematically parts of a frame according to a further embodiment of the invention.

In FIG. 6 an exemplary frame 600 is depicted. In order to detect monochrome frames, firstly an outer part (with a width $L_{bor}$) of the frame 600 might be cut to avoid border effects.

The rest of the frame 600 will then be divided in 5 parts: the corners {C1,C2,C3,C4}, where a channel logo can appear, and the rest of the frame $A_{Proc}$. To determine if a frame is monochrome the variance of the DC coefficients of region $A_{Proc}$ is calculated. If this variance is lower than the predetermined first threshold $\sigma_{mono}^2$, the frame will be classified as monochrome. Let $x_i$ be the n DC coefficients' values for region $A_{Proc}$, then the variance $\sigma^2$ is calculated as:

$$\sigma^2 = \frac{1}{n-1}\sum_{i=1}^{n}(x_i - \bar{x})^2 \quad (4)$$

where $$\bar{x} = \frac{1}{n}\sum_{i=1}^{n}x_i \quad (5)$$

To determine whether a monochrome frame contains a logo or not, the DC coefficients' variance $\sigma_i^2$ of each of the corner areas Ci are calculated and compared to a threshold $\sigma_{logo}^2$ as well. Since flashes are characterized by having a very high luminance, to determine whether the detected monochrome frame (with or without logo) is actually a flash, the mean luminance $\bar{\lambda}_{comp}$ of the frame will be compared to a threshold $\sigma_{flash}$. Summarizing, for each frame, its monochrome feature (MCH) value can be expressed as:

$$MCH = \begin{cases} MCH = MCH', & \text{if } \bar{\lambda}_{comp} < \sigma_{flash} \\ MCH = 2, & \text{otherwise} \end{cases} \quad (6)$$

$$MCH' = \begin{cases} 0 & \text{if } \sigma^2 > \sigma_{mono}^2 \\ \begin{cases} -1, & \text{if } \exists i, \sigma_i^2 > \sigma_{logo}^2 \text{(with Logo)} \\ 1, & \text{otherwise(without Logo)} \end{cases} & \sigma^2 \leq \sigma_{mono}^2 \end{cases} \quad (7)$$

Since for P and B-frames there are no DCT coefficients in the bitstream, the approximated DC coefficients using the closest to expected monochrome value algorithm discussed above are used instead.

In the case of B frames an alternative and faster approach can be also done. Monochrome frames come in a variable length train of consecutive frames which ranges from 1 single frame, to more than 20 in some cases. Therefore 2 different situations can occur:

1. Some of the monochrome frames in the train fall into an I or P type frame. In this case, if the monochrome could not be detected for the I or P frame, it will not be detected for any of the B-frames, since the B-frames are interpolated from their surrounding I or P frames.

2. The train is very short and all the monochrome frames fall into B frames. In this case, most of the macro-blocks of the monochrome B-frame cannot be predicted from any of the surrounding reference frames. Therefore, many macro-blocks will be intra-coded and their DCT coefficients will be available.

The alternative approach then is to analyze only those B-frames with a high proportion of intra-coded macro-blocks. This proportion represents a trade-off between speed and sensibility, but in any case should be big enough to ensure that they represent a significant part of the frame. The intra-coded DC coefficients are then analyzed in the same way as they were for I- or P-frames.

Since the DCT coefficients for the corner regions may not be present, the logo information is inherited from the closest I or P monochrome frame.

Figure 7:
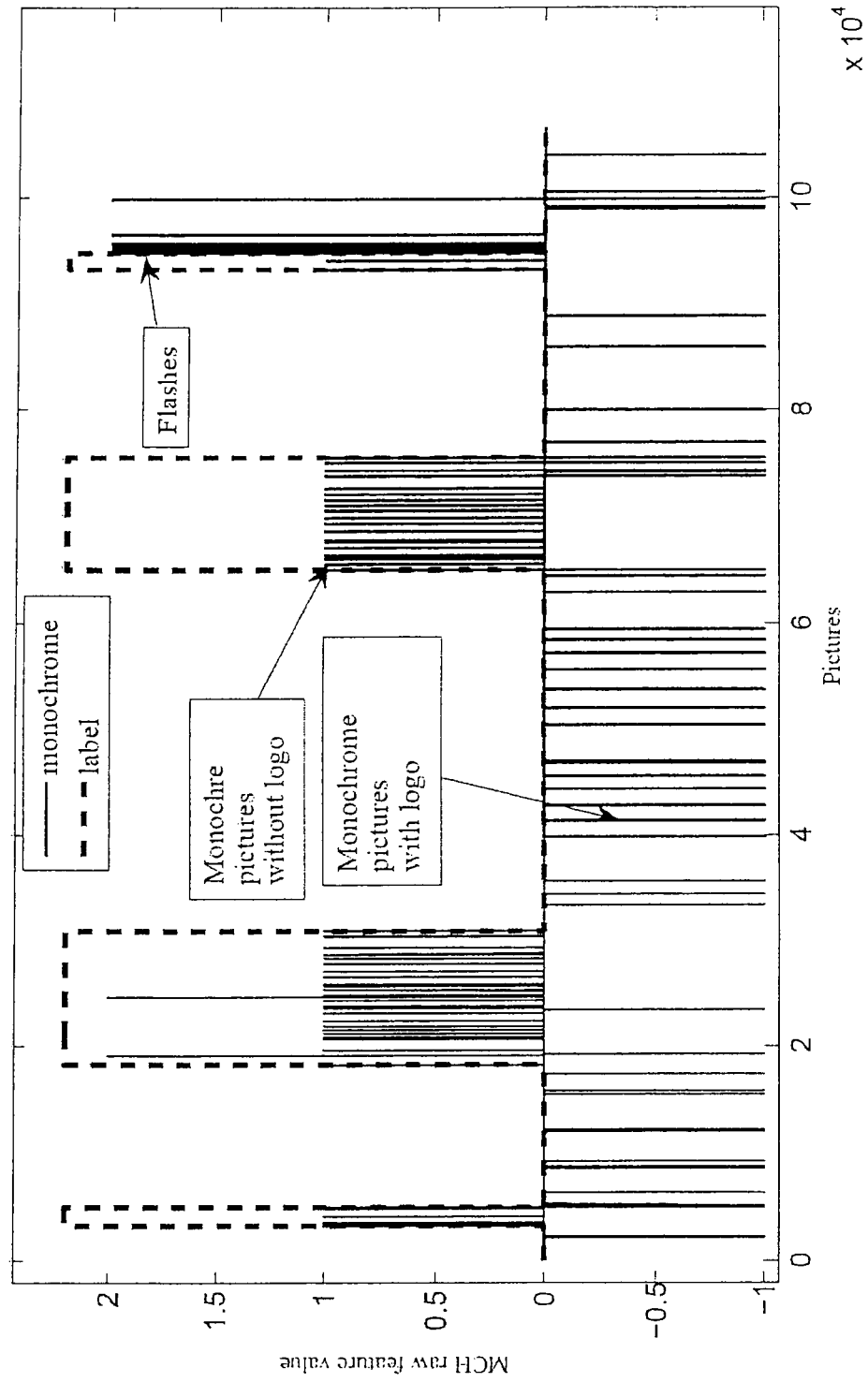
FIG. 7 shows schematically a classification scheme according to a further embodiment of the invention.

In FIG. 7 a result of a determination of the monochrome frame is depicted.

Finally, to determine whether a monochrome frame is actually a flash, the average ($\bar{\lambda}_{comp}$) of the luminance DC coefficients values is calculated. If this average is higher than a certain threshold $\tau_{flash}$ then monochrome frame is labeled as a flash (set value to 2).

The detection of monochrome frames can be used for several applications, like chaptering, video segmentation or commercial detection. For the purpose of commercial detection it has proved one of the most successful features for German TV broadcast content. In this case, only using this feature and a classification and regression tree, an overall accuracy of 96.5% can be achieved.

In this section a preprocessing method for the monochrome feature to do it suitable for commercial detection using pattern recognition classifiers is disclosed.

The monochrome frames detection raw feature estimates for every frame whether it is a monochrome frame or not. Commercials blocks are characterized by often having monochrome frames in the boundaries between two commercial spots. Therefore, the intention is to give the supervised learning algorithms information about the presence of monochrome frames in the surroundings, and not just in the current frame.

Figure 8A:
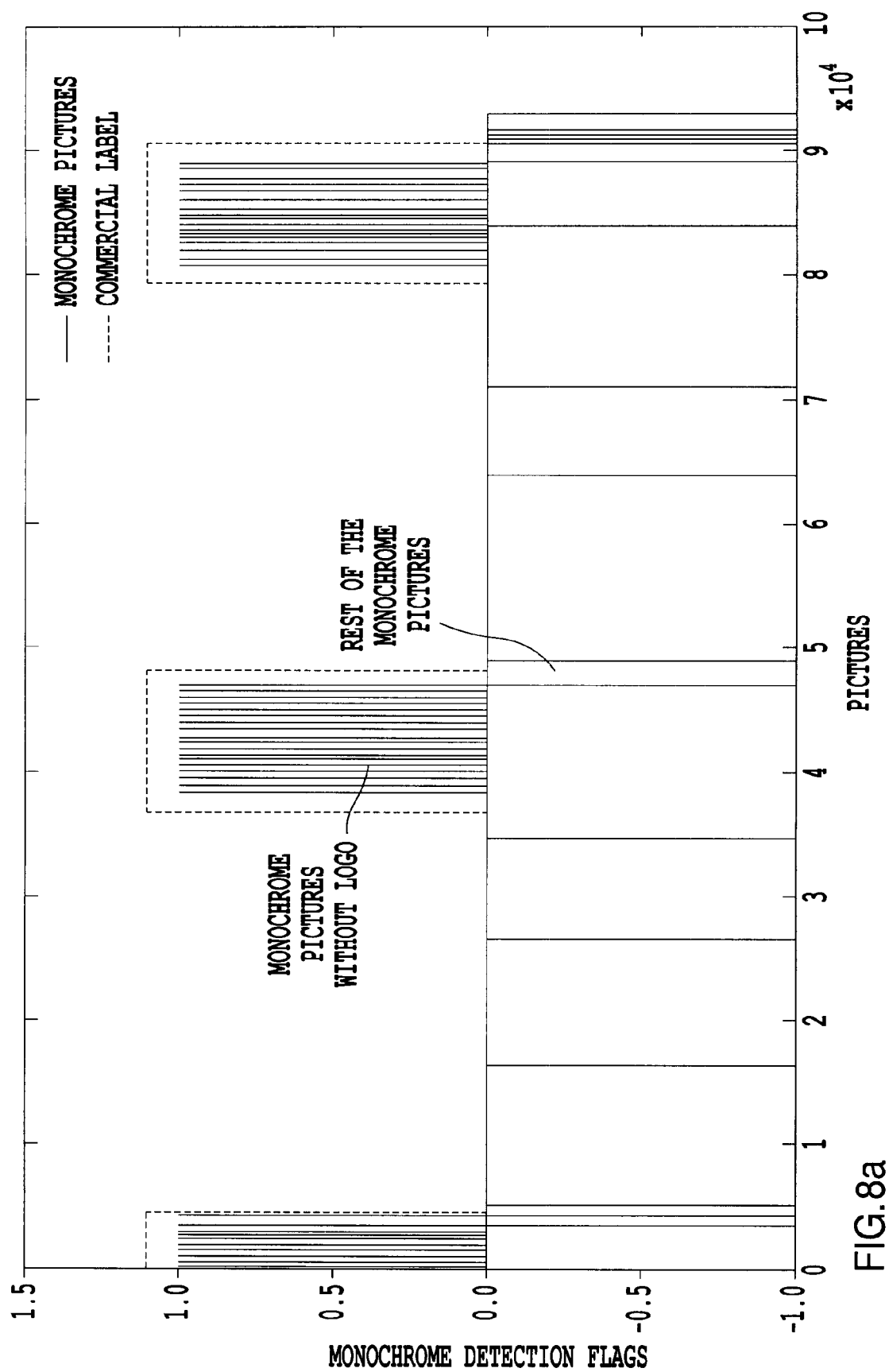
FIG. 8a shows schematically a classification scheme according to a further embodiment of the invention.
Figure 8B:
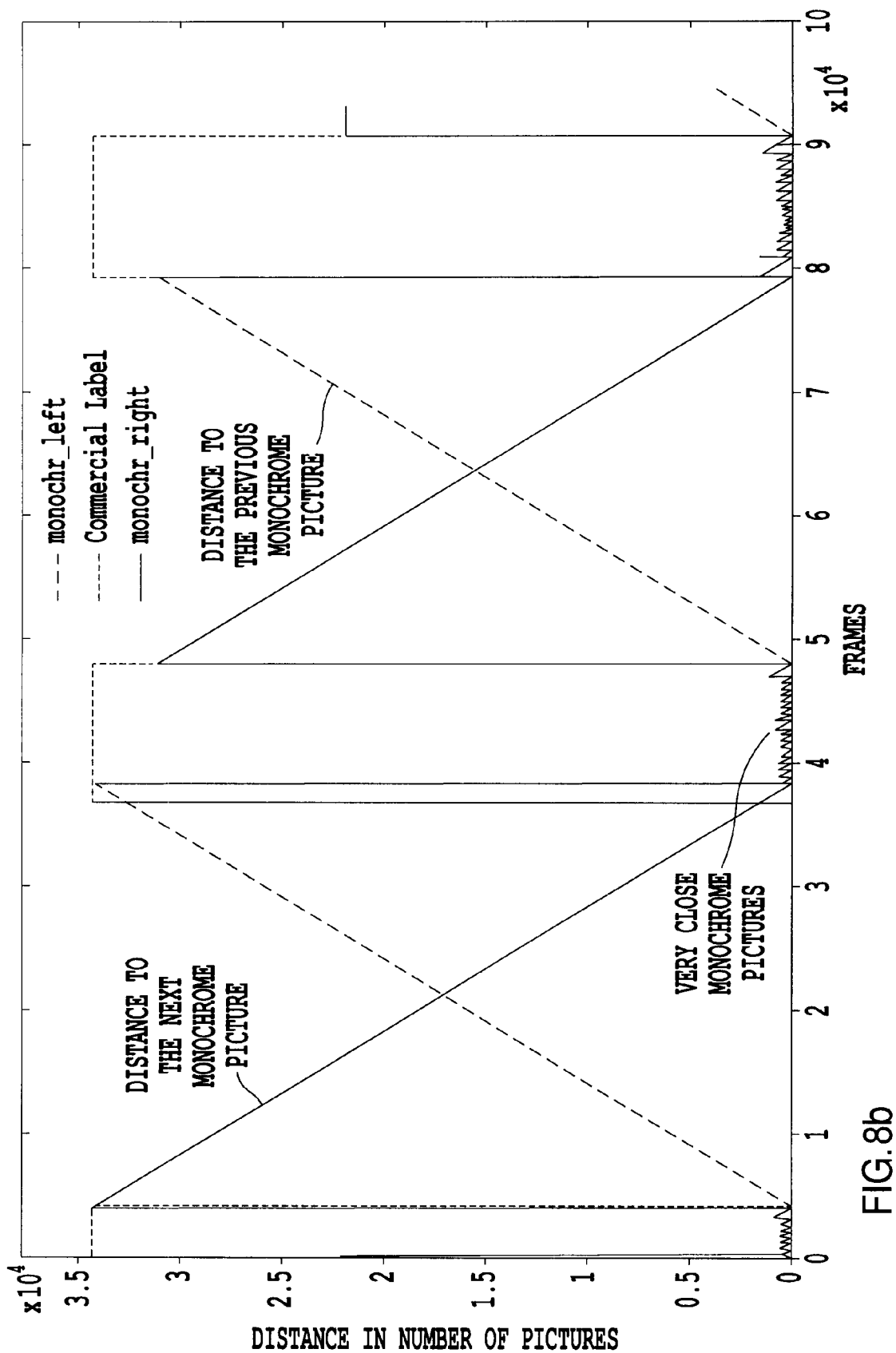
FIG. 8b shows schematically a classification scheme according to a further embodiment of the invention.

The proposed preprocessing algorithm gives as a result a pair of features arrays. The first array MCHL indicates, for every frame position, the distance (in frames) to the previous detected monochrome frame. Similarly, the second array MCHR indicates the distance to next detected monochrome frame. Given MCH(k) the raw feature for frame k, as described in equation (7), then $$MCHL(k) = \begin{cases} \infty & \text{if } \min(\kappa) > k \\ k - \max(\kappa), \max(\kappa) < k & \text{if } k < \min(\kappa) \end{cases} \quad (8)$$

$$MCHR(k) = \begin{cases} k - \min(\kappa), \min(\kappa) > k & \text{if } k < \max(\kappa) \\ \infty & \text{if } k > \max(\kappa) \end{cases} \quad (9)$$

where K is the set of all frame positions where MCH(k)=1. FIGS. 8a and 8b compares the raw feature MCH(k) with the superposition MCHL and MCHR obtained by pre-processing.

A method for detecting monochrome frames in digital video has been described. The monochrome feature will be extracted in the compressed domain. Thus, the method is working directly with compressed digital video. The method has been applied for MPEG-2 compressed video, but it could be applied to any other digital video standard which makes use of frequency domain transformations (like the discrete cosine transform or the wavelet transform) and motion estimation of the frames (by using motion vectors or similar approaches). The proposed method might also be referred to as "DC coefficients motion compensated interpolation".

Although specific embodiments have been illustrated and described herein, it will be appreciated by those of ordinary skill in the art that a variety of alternate and/or equivalent implementations may be substituted for the specific embodiments shown and described without departing from the scope of the described embodiments. This application is intended to cover any adaptations or variations of the specific embodiments discussed herein. Therefore, it is intended that this invention be limited only by the claims and the equivalents thereof.

The invention claimed is:

1. A method for approximating a DC coefficient of a first block of pixels of a first frame, comprising:
   calculating a luminance DC average value based on DC coefficients of first frame's macro-blocks without an approximation error;
   determining the DC coefficient of the first block based on the DC coefficient of a second block, wherein the second block is a part of a second frame, which is a reference frame of the first frame, the second block overlapping with a reference block of the first block and having the closest DC coefficient to the luminance DC average value;
   determining a third block belonging to a third frame that is a reference frame of the second frame, the third block having the largest overlap with a reference block of the second block; and
   determining the DC coefficient of the second block based on a DC coefficient of the third block;
   determining further DCT coefficients of the first block by calculating a DCT coefficient average value based on DCT coefficients of the first frame's macro-blocks without an approximation error; and
   determining the further DCT coefficients of the first block based on the DCT coefficient of a further second block, wherein the further second block is a part of the second frame, the further second block overlapping with the reference block of the first block and having the closest further DCT coefficient to the DCT coefficient average value,
   wherein when a current frame is a monochrome frame, the luminance DC average value is calculated based on
      the DC coefficients of a current frame intra-coded macro-block, making use of an absence any approximation error of intra-coded values,
      corresponding reference frames' forward, backward or bi-directionally predicted macro-blocks with zero motion vectors, making use of complete overlap of a reference region with the current sub block position and of the absence of the approximation error as motion vectors are zero, and
      corresponding reference frames' skipped macro-blocks for P-frames DC approximation, wherein in P-frames, skipped macro-blocks are equivalent to forward macro-blocks with zero motion vectors and no coded error.

2. The method according to claim 1, wherein the first frame's macro-blocks without an approximation error are predicted macro-blocks with a zero motion vector with respect to a reference macro-block or are macro-blocks that are skipped with respect to a reference macro-block or are macro-blocks of the first frame that are intra-coded.

3. The method according to claim 1 or 2, wherein during determining the DC coefficient of the first block an error coefficient (DCerr) is added to the DC coefficient of the second block.

4. A method for detecting a monochrome frame in a video stream comprising:
   approximating DC coefficients according to claim 1;
   determining the variance of DC coefficients in the first frame;
   classifying the first frame as monochrome if the variance is below a predetermined threshold.

5. The method according to claim 4, further comprising:
   dividing the first frame into at least two parts;
   determining the variance of DC coefficients for each of the parts;
   classifying the first frame as monochrome if the variance of at least one of the parts is below a first predetermined thresholds.

6. The method according to claim 5, wherein at least one of the at least two parts is a corner region of the first frame.

7. The method according to claim 6, wherein the first frame is divided into five parts and four of the five parts are the corner regions of the frame.

8. The method according to claim 5, wherein the first frame is classified as monochrome with a logo, if at least one of the variances of the parts is below the predetermined threshold and at least one of the variance of the parts is above the predetermined threshold.

9. The method according to claim 5, further comprising:
   determining an average of the luminance DC coefficients and classifying the first frame as a flash if the average is above a second predetermined threshold.

10. The method according to claim 4, further comprising:
    determining for every frame position an indication for the distance to the previous or to the next detected monochrome frame.

11. A device for approximating a DC coefficient of a first block of pixels of a first frame, comprising:
    a calculation unit configured to calculate a luminance DC average value based on DC coefficients of first frame's macro-blocks without an approximation error; and
    a determination unit configured to determine the DC coefficient of the first block based on the DC coefficient of a second block, wherein the second block is a part of a second frame, which is a reference frame of the first frame, the second block overlapping with a reference block of the first block and having the closest DC coefficient to the luminance DC average value, the determination unit determining a third block belonging to a third frame that is a reference frame of the second frame, the third block having the largest overlap with a reference block of the second block, and the determination unit determining the DC coefficient of the second block based on a DC coefficient of the third block;
    determining further DCT coefficients of the first block by calculating a DCT coefficient average value based on DCT coefficients of the first frame's macro-blocks without an approximation error; and
    determining the further DCT coefficients of the first block based on the DCT coefficient of a further second block, wherein the further second block is a part of the second frame, the further second block overlapping with the reference block of the first block and having the closest further DCT coefficient to the DCT coefficient average value, wherein when a current frame is a monochrome frame, the calculation unit calculates the luminance DC average value based on the DC coefficients of a current frame intra-coded macro-block, making use of an absence any approximation error of intra-coded values, corresponding reference frames' forward, backward or bi-directionally predicted macro-blocks with zero motion vectors, making use of complete overlap of a reference region with the current sub-block position and of the absence of the approximation error as motion vectors are zero, and corresponding reference frames' skipped macro-blocks for P-frames DC approximation, wherein in P-frames, skipped macro-blocks are equivalent to forward macro-blocks with zero motion vectors and no coded error.

12. The device according to claim 11, wherein the first frame's macro-blocks without an approximation error are predicted macro-blocks with a zero motion vector with respect to a reference macro-block or are macro-blocks that are skipped with respect to a reference macro-block or are macro-blocks of the first frame that are intra-coded.

13. A device for detecting a monochrome frame in a video stream comprising:
 a device according to claim 11;
 a variance determination unit configured to determine the variance of DC coefficients in the frame; and
 a classification unit configured to classify the frame as monochrome if the variance is below a predetermined threshold.

14. The device according to claim 13, wherein the classification unit is further configured to divide the frame into at least two parts; to determine the variance of DC coefficients for each of the parts; and to classify the frame as monochrome if the variance of at least one of the parts is below a first predetermined threshold.

15. A non-transitory computer readable storage medium, comprising a non-transitory computer program product including computer program instructions that cause a computer to execute a method according to claim 1 when the computer program instructions are executed on the computer.

* * * * *